Patented Apr. 18, 1933

1,904,452

UNITED STATES PATENT OFFICE

ROBERT T. HASLAM, OF WESTFIELD, NEW JERSEY, ASSIGNOR TO STANDARD OIL DEVELOPMENT COMPANY, A CORPORATION OF DELAWARE

FATTY ACIDS AND PROCESS FOR PREPARING SAME

No Drawing. Application filed August 14, 1930. Serial No. 475,395.

This invention relates to a process for preparing oxidation products of paraffin, such as fatty acids, anhydrides, aldehydes, ketones and the like.

The preparation of fatty acids and the like by oxidation of paraffin wax is a well known process. In practice it has been found preferable to use only pure and refined paraffin, because the usual impurities associated with crude paraffin wax form obnoxious oxidation compounds. Recently it has been disclosed that hydrogenated paraffin or paraffin separated from hydrogenated oils is especially suitable for this purpose.

Now I have found that it is possible to use the hydrogenated paraffin-containing oils themselves, thus avoiding the expensive operation of separating the paraffin from the oil. While it is true that the oil itself may be partially oxidized, the paraffin oxidizes in preference to the oil and at lower temperatures. I have found also that the hydrogenation of a heavy hydrocarbon oil markedly increases the wax content thereof, so that such oils are further adapted for my purposes. My process will be fully understood from the following description.

Hydrocarbon oil in which waxy constituents may be originally present, or in which they may be produced by hydrogenation, is passed, preferably in admixture with hydrogen, through a heating zone in which it is heated to a temperature of about 700° F. The heated mixture is discharged into a reaction chamber maintained under a pressure in excess of 25 atmospheres and preferably 200 atmospheres or higher, wherein it is maintained at temperatures above 650° F. and preferably about 750 to 800° F. principally by the heat of hydrogenation. The reaction chamber is adapted to withstand high pressures and temperatures and is also resistant to hydrogen attack and preferably contains a suitable hydrogenating catalyst immune to sulfur poisoning such as mixtures of the oxides of chromium and molybdenum or molybdenum and tungsten or oxides of other metals of the sixth periodic group, preferably in combination with magnesium oxide or zinc oxide or oxides of other metals of the third and fourth periodic groups. Hot reactants leave the reaction chamber and flow in heat interchange relationship with incoming cold feed material to a separating and condensing drum wherein liquid products are separated from uncondensed gases. The liquid product is drawn off and may be oxidized without further treatment.

In general oxidation is effected by means of oxygen, air or other oxygen-containing gas, and is preferably carried out in the presence of suitable catalytic materials.

The hydrogenated paraffin-containing oil is maintained at temperatures of above 250° F. and preferably about 350° F. or higher during the air blow. Some means for keeping the mixture cool, such as a jacket or cooling coil, for example, is necessary because the oxidation reaction is strongly exothermic. The air blow is continued until the oil becomes slightly yellow. It is not desirable to carry oxidation further than this because dark-colored gummy materials begin to form. The more volatile acids produced during the oxidation will be swept out of the oil by the air and suitable means for absorbing them must be provided, such as a tower packed with activated charcoal for example. If desirable a hot inert gas may be blown through the oil along with the air to effect a simultaneous oxidation and distillation. The remainder of the acids formed may be extracted from the unoxidized residue by distillation or by saponification and extraction and about 50 to 70% of the paraffin wax will in general be found to have been oxidized.

The oxidation is ordinarily carried out under atmospheric pressure but higher pressures may be used.

A wide variety of materials will catalyze this oxidation. Among these are the stearates of manganese, zinc, aluminum and many other metals, manganese dioxide, potassium permanganate, kerosene and comminuted hard coke or even the oxidized paraffin itself. The quantity of catalyst necessary is about 0.1 to 5% and in general there is no advantage in using a greater amount than this.

As an example, a dark-colored Mid-Continent paraffin distillate of 26.7° A. P. I. gravity and wax content of 30% is hydrogenated at 686° F. and 200 atmospheres pressure in the presence of a catalytic mixture of molybdenum oxide, magnesium oxide and zinc oxide and the liquid product obtained is water white, has a gravity of 29.5° A. P. I. and a wax content of 70%. The wax, moreover, is exceptionally pure and similar to that obtained in most cases only by prolonged acid and clay treatment. By oxidation it is possible to convert about 70% of its wax content into useful fatty acids. Ordinarily, unsaturated compounds, such as olefins, normally present in hydrocarbon oil, must be removed from the oil by treatment with fuming sulfuric acid or other suitable reagents before oxidation, because they form particularly objectionable oxidation compounds. Hydrogenation of the oil obviates this difficulty because it substantially saturates all unsaturated compounds present in the oil and in addition eliminates sulfur and other impurities.

It will be understood that my process is not limited to the use of a paraffin distillate but may be applied equally well to a hydrocarbon oil, naturally low in waxy constituents, which has been fortified with a substantial amount of paraffin wax. This oil may be hydrogenated, then oxidized and the fatty acids formed separated, and the remaining unoxidized oil may again be submitted to hydrogenation and oxidation.

My process may also be used on a hydrogenated wax-containing oil from which a portion of the oil has been removed, and this would be desirable particularly in the case where the oil is of high quality and would be partially impaired by oxidation. Moreover, in any case, the oil may be recovered from the oxidized product and is suitable for use as lubricating oil.

My process is not to be limited by any theory of the mechanism of the reaction nor by any details of operation given, but only by the following claims in which I wish to claim all novelty inherent in this invention.

I claim:

1. Improved process for producing oxidation products of paraffin which comprises adding a substantial quantity of waxy constituents to a hydrocarbon oil, maintaining the mixture in a reaction zone under a high pressure of hydrogen and at temperature adjusted to substantially saturate the oil, removing a hydrogenated product from said reaction zone, reducing pressure on said product, and blowing oxygen-containing gas therethrough while maintained at a temperature of about 350° F.

2. Improved process for preparing fatty acids and the like from paraffin wax which comprises hydrogenating a hydrocarbon oil the wax content of which may be increased by hydrogenation, removing a portion of the oil from the hydrogenated product, and oxidizing the hydrogenated wax in the presence of the remaining oil.

3. Improved process for preparing fatty acids and the like from paraffin wax comprising hydrogenating a hydrocarbon oil, whereby its wax-content is increased, and oxidizing the hydrogenated oil-wax mixture with air at temperatures above about 250° F.

4. Process for preparing fatty acids and the like from waxy constituents contained in hydrocarbon oil without at the same time producing objectionable oxidation products, which comprises first saturating the oil and then oxidizing the waxy constituents in the presence of the saturated oil.

5. Process for preparing oxidized products of paraffin wax which comprises first hydrogenating a petroleum fraction containing waxy constituents under conditions of temperature and pressure such that the oil is substantially saturated and purified of sulfur and asphalt forming materials, then oxidizing the waxy constituents in the presence of the saturated oil.

6. Process according to claim 5 in which the hydrogenation is accomplished at temperatures between 650 and 800° F., under pressures in excess of 25 atmospheres and in the presence of a hydrogenating catalyst.

7. Process according to claim 5 in which hydrogenation is accomplished under pressures of about 200 atmospheres and oxidation is carried out under substantially atmospheric pressure and at temperatures of about 350° F.

ROBERT T. HASLAM.